United States Patent
Dhawan et al.

(10) Patent No.: US 9,959,136 B2
(45) Date of Patent: *May 1, 2018

(54) OPTIMIZATIONS AND ENHANCEMENTS OF APPLICATION VIRTUALIZATION LAYERS

(71) Applicant: Citrix Systems, Inc., Fort Lauderdale, FL (US)

(72) Inventors: Mohit Dhawan, San Jose, CA (US); Aman Sethi, San Jose, CA (US); Yashabh Sethi, Mountain View, CA (US); Sheldon Lachambre, Chalfont (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/637,089

(22) Filed: Jun. 29, 2017

(65) Prior Publication Data
US 2017/0300351 A1    Oct. 19, 2017

Related U.S. Application Data

(63) Continuation of application No. 14/963,837, filed on Dec. 9, 2015, now Pat. No. 9,753,759.

(60) Provisional application No. 62/159,394, filed on May 11, 2015.

(51) Int. Cl.
*G06F 9/455* (2006.01)

(52) U.S. Cl.
CPC ............ *G06F 9/45558* (2013.01); *G06F 2009/45595* (2013.01)

(58) Field of Classification Search
None
See application file for complete search history.

(56) References Cited

U.S. PATENT DOCUMENTS

| 7,076,764 B2* | 7/2006 | Kramer | ............ G06F 8/20 717/102 |
| 2005/0050155 A1* | 3/2005 | McGee | ............ H04L 29/06 709/213 |

OTHER PUBLICATIONS

Apr. 5, 2017—U.S. Notice of Allowance—U.S. Appl. No. 14/963,837.

* cited by examiner

*Primary Examiner* — Sisley Kim
(74) *Attorney, Agent, or Firm* — Banner & Witcoff, Ltd.

(57) ABSTRACT

Methods, systems, and computer-readable media for optimizing and enhancing delivery of application virtualization layers to client computing devices are described herein. In various embodiments, an application virtualization layer optimization service may identify a first and a second application virtualization layer to be delivered to one or more client computing devices. Each application virtualization layer may represent a package of one or more applications. A layer analysis service may analyze the first and second application virtualization layers to determine conflicts between the layers, using predetermined conflict analysis rules, and generate an actionable conflict resolution report based on the analysis. Based on the actionable conflict resolution report, the application virtualization layer optimization service may resolve conflicts between the first and second application virtualization layers, order the first and application virtualization layers, and deliver the ordered layers to the one or more client computing devices.

20 Claims, 7 Drawing Sheets

OPTIMIZATIONS AND ENHANCEMENTS OF APPLICATION VIRTUALIZATION LAYERS

CROSS REFERENCE TO RELATED APPLICATIONS

This application is a continuation of and claims priority to U.S. patent application Ser. No. 14/963,837, filed on Dec. 9, 2015, and entitled "Optimization and Enhancement of Application Virtualization Layers," which in turn claims priority to provisional U.S. Application No. 62/159,394, filed May 11, 2015, entitled "Optimizations and Enhancements of Virtual Application Layers," the disclosures of which are incorporated by reference herein in their entirety for all purposes.

FIELD

Aspects described herein generally relate to computer hardware and software and virtualized computer systems. In particular, one or more aspects of the disclosure generally relate to computer hardware and software for delivering application virtualization layers to client computing devices.

BACKGROUND

Many enterprises (e.g., corporations, partnerships, governments, academic institutions, other organizations, etc.) find it challenging to deploy systems for managing client computing devices by using standardized operating systems and applications. For example, an enterprise may wish to deliver an image containing an operating system and a set of applications to their end users. However, the enterprise may have hundreds, if not thousands, of computing devices in the organization. To complicate matters further, the computing devices are typically not homogenous and have a set of widely ranging capabilities. Moreover, the roles of the users across the organization differ greatly, which makes the task of defining a set of applications that supports all of the wide-ranging roles a herculean effort.

Typical approaches to address these complexities usually involve narrowing down the large number of combinations to a manageable number and creating distinct images or virtual disks for each of the pre-determined device and application combinations. However, these approaches have not been without their share of problems. Each image must be built from scratch, which is time-consuming and inefficient. Each image must then be tested to ensure that the selected mix of operating system and applications are compatible with each other. And, finally, the content of the images, once created, is typically set in stone. If any of the applications comprised within the image needs to be updated, the image must be recreated and tested again from scratch.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for optimizing and enhancing the delivery of application virtualization layers to client computing devices. In particular, aspects described herein provide conflict resolution algorithms that may be used to automatically analyze and resolve compatibility conflicts between application virtualization layers. Aspects of the disclosure described in greater detail below may be used to prioritize and merge a plurality of application virtualization layers based on the compatibility conflict analysis. Specifically, aspects of the disclosure relate to a computing environment for delivering the analyzed, prioritized, and merged application virtualization layers to client computing devices based on the capabilities of the target computing devices and the roles of the users login into the client computing devices.

In some instances, an application virtualization layer optimization service may identify a first and a second application virtualization layer to be delivered to one or more client computing devices. Each of the application virtualization layers may represent a package of one or more applications. The application virtualization layers may comprise files, system registry entries, and data related to the one or more applications comprised by the application virtualization layer. For example, the first application virtualization layer may comprise an operating system virtualization layer and the second application virtualization layer may comprise one or more applications specific to one or more predetermined users with a common-set of roles.

In one or more embodiments, a layer analysis service may analyze the first and second application virtualization layers for conflicts between the layers, using predetermined conflict analysis rules. The layer analysis service may also be configured to generate an actionable conflict resolution report based on the analysis of the first and second application virtualization layers. Subsequently, the application virtualization layer optimization service may resolve the conflicts indicated on the actionable conflict resolution report. The application virtualization layer optimization service may be further configured to order the first and second application virtualization layers, based on the actionable conflict resolution report. The method may further comprise delivering the ordered first and second application virtualization layers to the one or more client computing devices.

In some embodiments, the layer analysis service may determine one or more operational characteristics for the first and second application virtualization layers. The application virtualization layer operational characteristics may comprise at least one or more of the following: boot-time dependencies, run-time dependencies, login-time dependencies, operating system dependencies, computer architecture dependencies, framework dependencies, shared library dependencies, dynamically-linked library dependencies, application programming interface dependencies, and services dependencies. The layer analysis service may compare the one or more operational characteristics of the first application virtualization layer with the one or more operational characteristics of the second application virtualization layer. The layer analysis service may determine, based on the comparison, one or more operational characteristics of the first application virtualization layer that conflict with the corresponding operational characteristics of the second application virtualization layer. Additionally, the layer analysis service may determine a priority or precedence order for the first and second application virtualization layer, and a candidate target computing device compatible with the first and second application virtualization layers, based on the comparison.

In other embodiments, the layer analysis service may be further configured to analyze each of the one or more applications comprised by the first application virtualization layer for conflicts with each of the other one or more applications comprised by the first application virtualization layer, using predetermined conflict analysis rules. Similarly, the layer analysis service may also analyze each of the one or more applications comprised by the first application virtualization layer for conflicts with each of the other one or more applications comprised by the first application virtualization layer, using predetermined conflict analysis rules.

In other instances, the application virtualization layer optimization service may be configured to merge the ordered first and second application virtualization layers into a single combined application virtualization layer, based on the actionable conflict resolution report. The application virtualization layer optimization service may be configured to not include an isolation layer between the merged first and second application virtualization layers, such that the one or more applications originally in the first application virtualization layer may not be isolated from the one or more applications originally in the second application virtualization layer in the merged application virtualization layer. In such instances, the application virtualization layer optimization service may deliver the merged application virtualization layer to the one or more client computing devices.

Alternatively, in yet other instances, the one or more client computing devices may merge the ordered first and second application virtualization layers into a single combined application virtualization layer, based on the actionable conflict resolution report.

In some embodiments, the application virtualization layer optimization service may be configured to determine which of the one or more client computing devices are compatible with the ordered first and second application virtualization layers based on the actionable conflict resolution report, and to deliver the ordered first and second application virtualization layers to the compatible one or more client computing devices.

In other embodiments, one or more applications in the second application virtualization layer may be updated causing the layer analysis service to re-analyze the updated second application virtualization layer with the first application virtualization layer and generate a second actionable conflict resolution report based on the re-analysis. The application virtualization layer optimization service may resolve the conflicts indicated on the second actionable conflict resolution report, order the first application virtualization layer and the updated second application virtualization layer based on the second actionable conflict resolution report, merge the ordered first and updated second application virtualization layers into a single combined application virtualization layer based on the second actionable conflict resolution report, and deliver the merged application virtualization layer to the one or more client computing devices.

In some instances, the application virtualization layer optimization service may deliver the ordered first and second application virtualization layers as part of a boot sequence of the one or more client computing devices.

In other instances, the application virtualization layer optimization service may deliver the ordered first and second application virtualization layers to one or more client computing devices in response to a user login.

In yet other instances, the method may comprise determining the identity of the user login into the particular client computing device. The method may further comprise determining whether to deliver the first application virtualization layer to the client computing device based on the identity of the user login into the particular client computing device. Similarly, the method may comprise determining whether to deliver the second application virtualization layer to the client computing device based on the identity of the user login into the particular client computing device.

Specialized systems and non-transitory computer readable media may be configured to provide and/or support various aspects described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for delivering application virtualization layers to one or more client computing devices. In particular, aspects described herein may be used to automatically analyze application virtualization layers to determine conflicts between the application virtualization layers and generate an actionable conflict resolution report comprising the results of the conflict analysis. Other aspects described herein may be used to resolve the conflicts indicated in the actionable conflict resolution report. Other aspects described herein may be used to prioritize and order the application virtualization layers based on the actionable conflict resolution report. Yet other aspects described herein may be used to merge the prioritized and ordered application virtualization layers and deliver the application virtualization layers to one or more client computing devices.

Before discussing these concepts in greater detail, several examples of computing architecture and systems that may be used in implementing and/or otherwise providing various aspects of the disclosure will first be discussed with respect to FIGS. 1-6.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
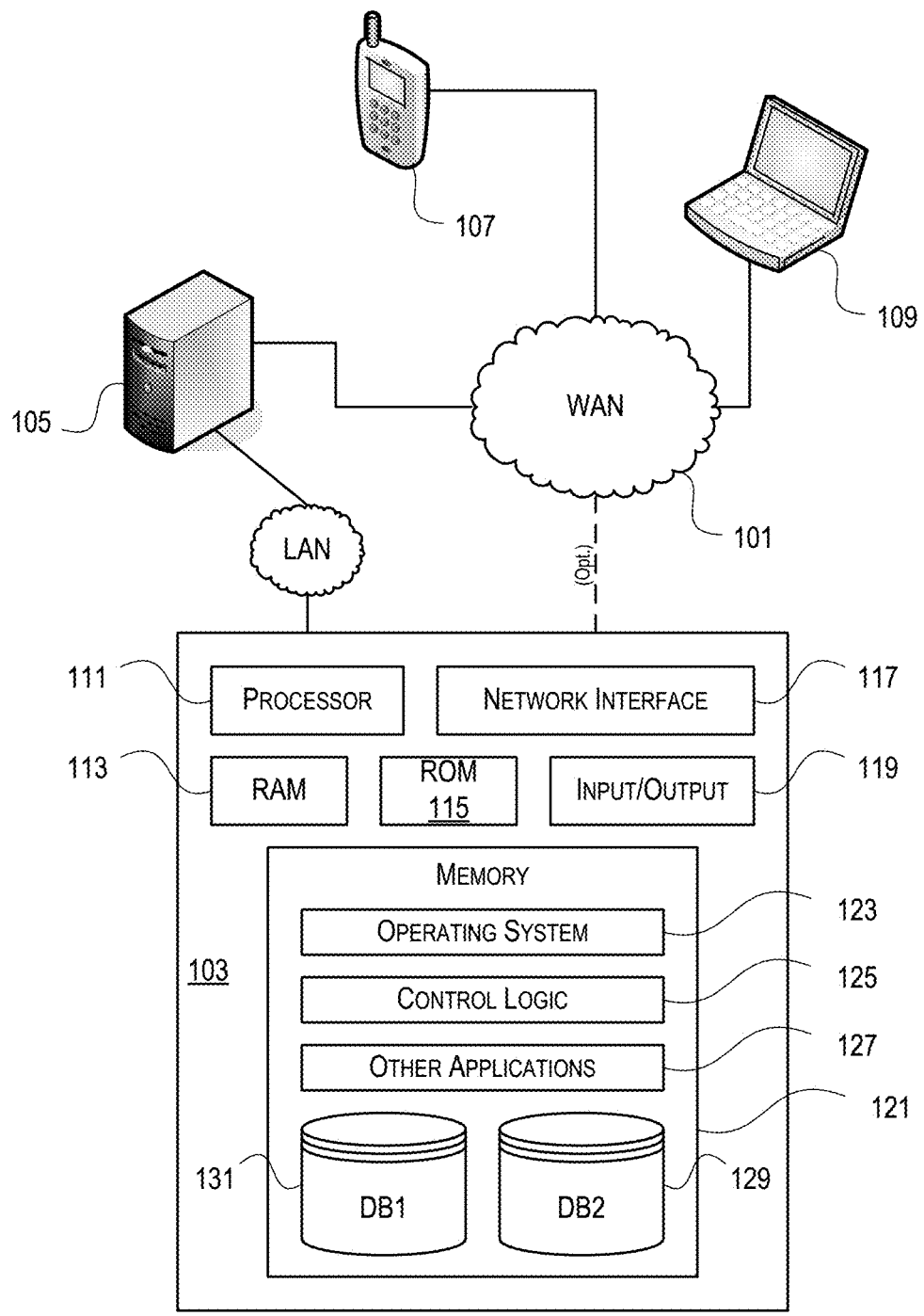
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device.

The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
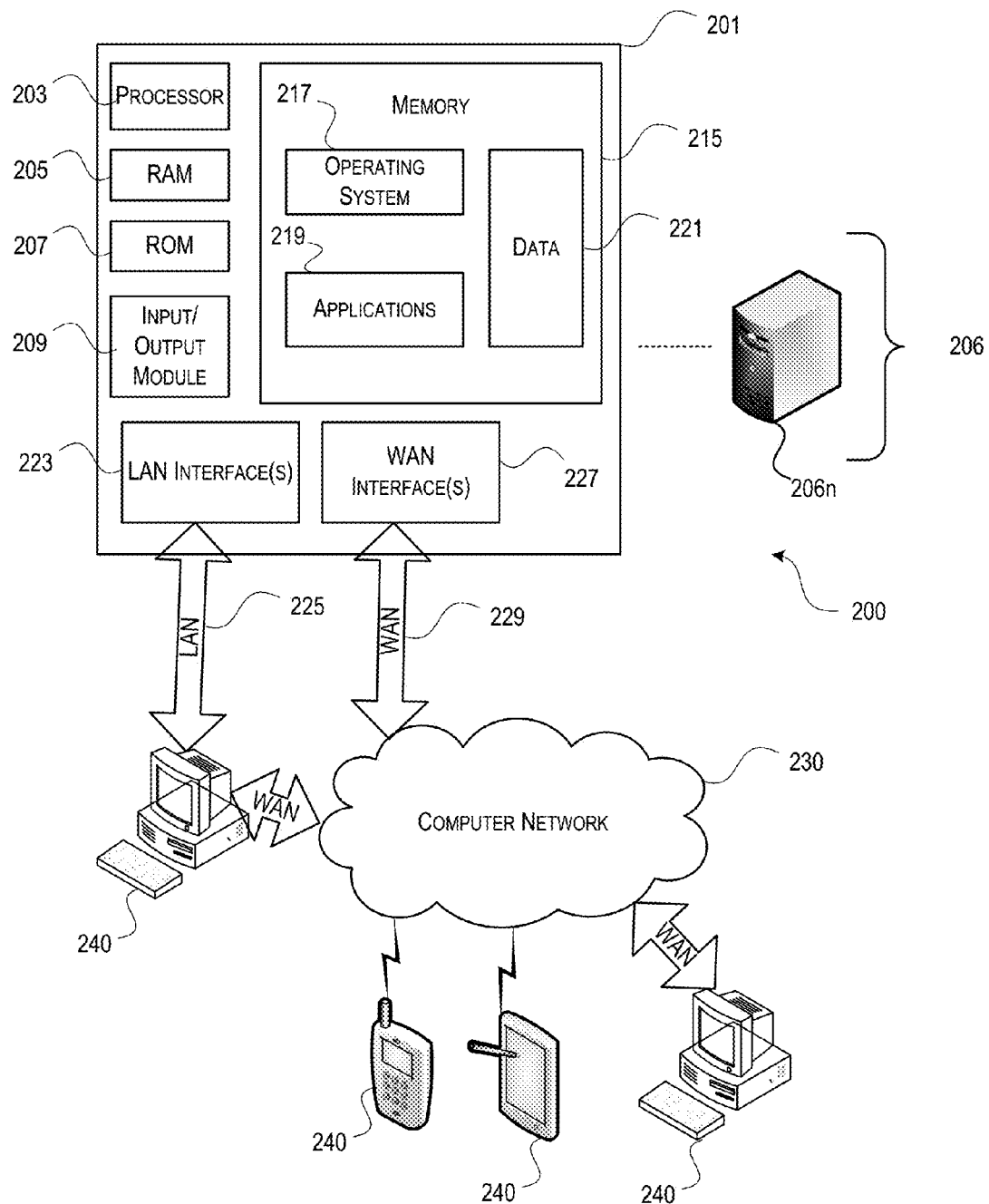
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other specially adapted or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
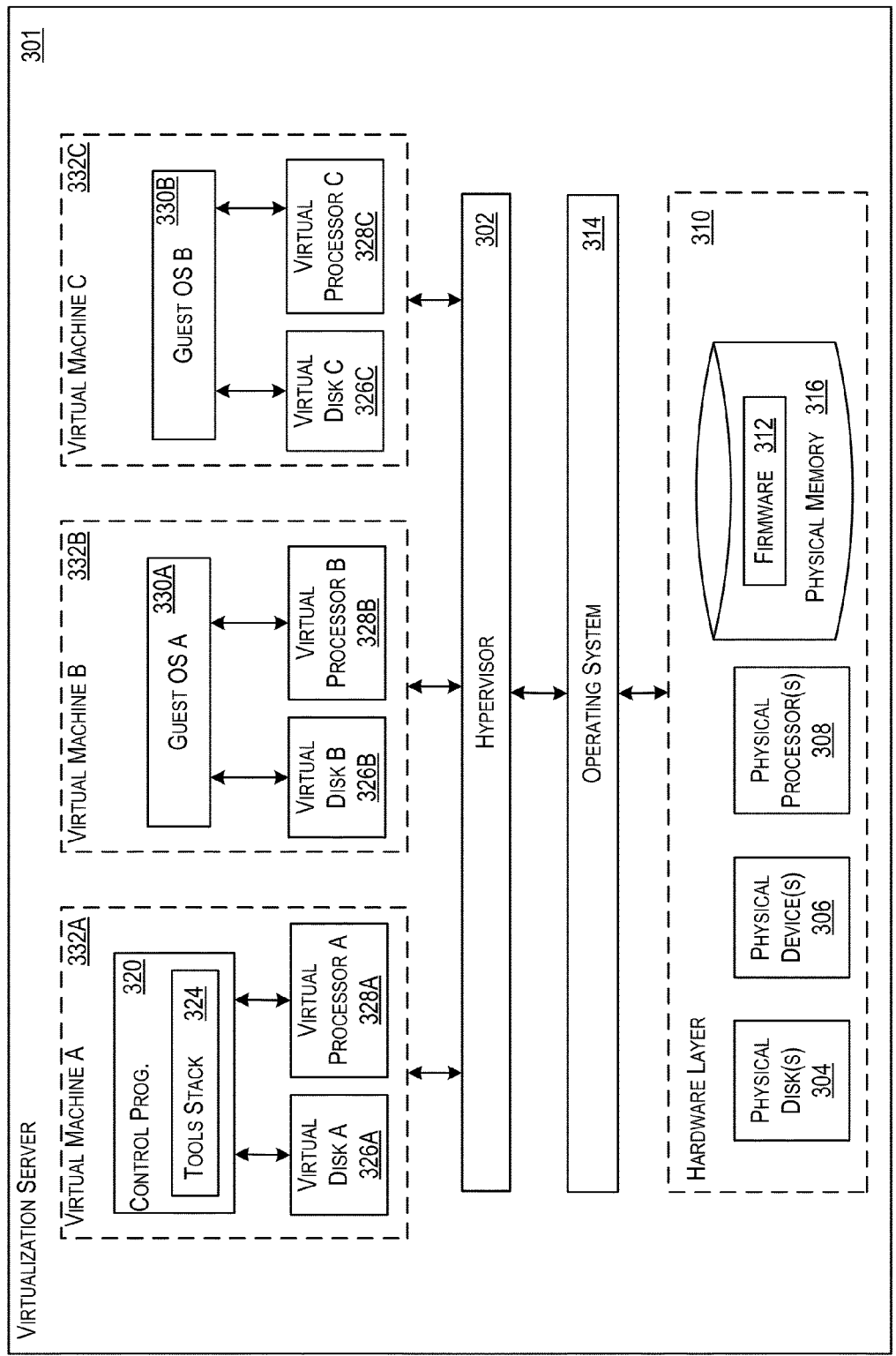
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0 Domain 0 or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
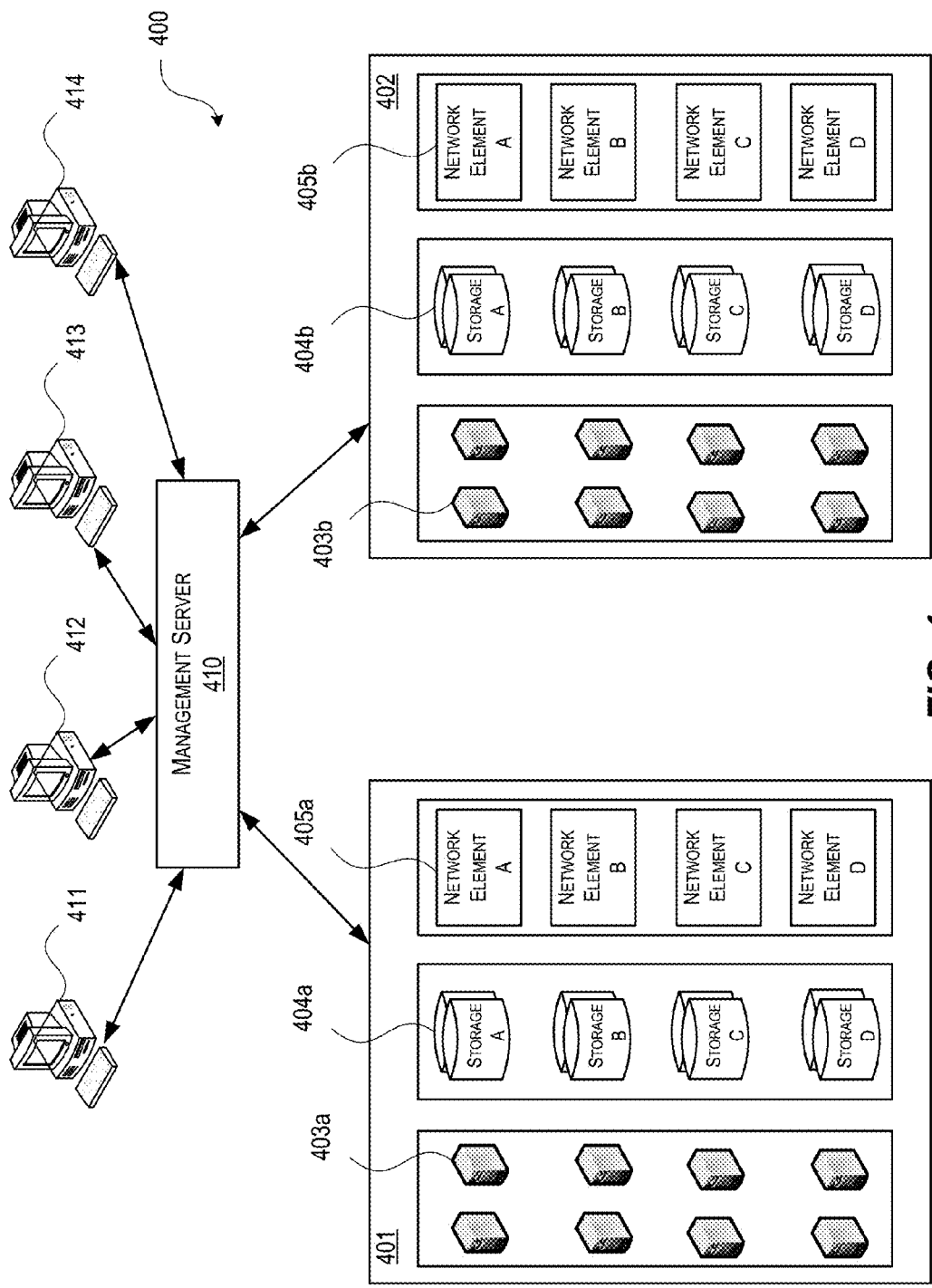
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Illustrative Embodiments

Having discussed several examples of the computing architecture that may be used in providing and/or implementing various aspects of the disclosure, a number of embodiments will now be discussed in greater detail. In particular, and as introduced above, some aspects of the disclosure generally relate to optimizations and enhancements to the delivery of application virtualization layers to client computing devices. In the description below, various examples illustrating how application virtualization layers may be analyzed, prioritized, merged, and delivered in accordance with one or more embodiments will be discussed.

Figure 5:
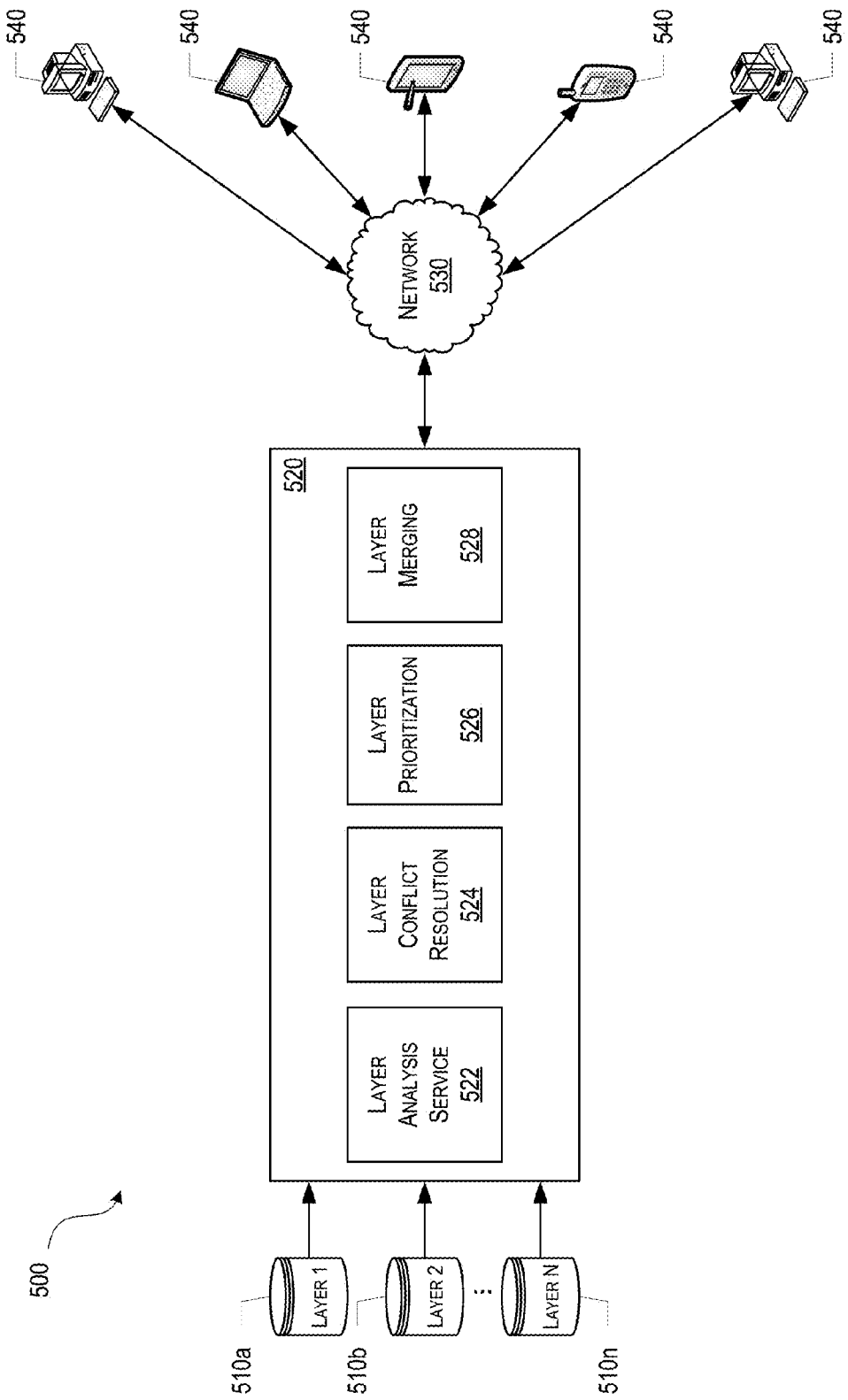
FIG. 5 depicts an illustrative system architecture which may be used for delivering application virtualization layers to one or more client computing devices, according to one or more illustrative aspects described herein.

FIG. 5 depicts an illustrative system architecture which may be used for delivering application virtualization layers to one or more client computing devices in accordance with one or more example embodiments. As seen in FIG. 5, the application virtualization layer optimization service 520 may obtain and process application virtualization layers 510 and deliver the processed application virtualization layers to one or more client computing devices 540 over network 530. The architecture of the system depicted in FIG. 5 is similar in many respects to the architecture of computing environments described above with reference to FIGS. 1, 2, and 4 and may include additional features not mentioned above. Some of the components of the computing environments described above with reference to FIGS. 1, 2, and 4 have been omitted for the sake of simplicity.

Referring to FIG. 5, the application virtualization layers 510 may contain the information necessary to deliver one or more applications to client computing devices 540 and for the client computing devices 540 to execute the one or more applications contained in the application virtualization layers 510. For example, the application virtualization layers 510 may include files, system registry entries, and data related to one or more applications to be delivered and executed by the client computing devices 540. The data related to the one or more applications may include Windows Management Instrumentation (WMI) data entries, Component Object Model (COM+) registration information, Security Account Manager (SAM) database entries, and the like. The one or more applications comprised within the application virtualization layers 510 may appear to be natively installed on the client computing devices 540 once the client computing devices 540 have executed the contents of the application virtualization layers 510. That is, from the point of view of the application and of the client computing device, there may be no difference between an application being installed natively on the client computing device and being deployed via an application virtualization layer. The application virtualization layers 510 may be created such that they are independent from a base operating system. The application virtualization layers 510 may be capable of deploying to a variety of operating system types and versions. For example, an application virtualization layer 510 may be deployed to a client computing device 540 running one type of operating system (e.g., WINDOWS 7, manufactured by Microsoft Corporation of Redmond, Wash.) and the same application virtualization layer 510 may also be deployed to another client computing device 540 running another type of operating system (e.g., WINDOWS 8, manufactured by Microsoft Corporation of Redmond, Wash.) In some embodiments, the application virtualization layers 510 may be deployed on client computing devices 540 with a pre-installed operating system. In other embodiments, an application virtualization layer may comprise an operating system for the client computing devices 540. For example, as part of the boot-up sequence for a client computing device 540, the client computing device 540 may execute the operating system comprised by an application virtualization layer 510.

Computing environment 500 may include one or more computing devices. For example, computing environment 500 may include an application virtualization layer optimization service 520. The application virtualization layer optimization service 520 may comprise a single-server, a multi-server system, or a cloud-based system, including at least one virtualization server, as described above with reference to FIG. 4. The application virtualization layer optimization service 520 may be configured to perform one or more of the various functions described herein. Computing environment 500 also may include one or more client computing devices 540. Client computing devices 540 may be any type of computing device capable of receiving and processing input via one or more user interfaces, providing output via one or more user interfaces and communicating input, output, and/or other information to and/or from one or more other computing devices. For example, client computing devices 540 may be a server computer, a desktop computer, laptop computer, tablet computer, smart phone, or the like. In addition, client computing devices 540 may be one of the computing devices described above in reference to FIGS. 1, 2, and 4 (e.g., devices 103, 105, 107, 109, 240, and 411-414.) In some instances, client computing devices 540 may be special-purpose computing devices configured to perform specific functions. For example, client computing devices 540 may store, execute, and/or otherwise include various software applications for receiving, storing, and executing application virtualization layers delivered by the application virtualization layer optimization service 520 over network 530.

Computing environment 500 also may include one or more networks, which may interconnect the application virtualization layer optimization service 520 and the client computing devices 540. For example, computing environment 500 may include network 530, which may include one or more private networks (which may, e.g., be operated by and/or associated with an organization that operates application virtualization layer optimization service 520 and which may include one or more local area networks, wide area networks, virtual private networks, etc.) and/or one or more public networks (e.g., the Internet).

As illustrated in FIG. 5, the application virtualization layer optimization service 520 may include a layer analysis service 522, a layer conflict resolution module 524, a layer prioritization module 526, and a layer merging module 528. Each of the modules comprised in the application virtualization layer optimization service 520 may be implemented using hardware, software, or a combination of hardware and software. The layer analysis service 522 may be configured to generate an actionable conflict resolution report based on an analysis of the application virtualization layers 510 obtained by the application virtualization layer optimization service 520. The layer analysis service 522 is described in further detail below in reference to FIG. 6.

The layer conflict resolution module 524 may be configured to resolve the conflicts indicated on the actionable conflict resolution report generated by the layer analysis service 522. The layer conflict resolution module 524 may iterate through all the actionable conflicts comprised in the actionable conflict resolution report and determine a resolution to the conflict in a manner that maximizes compatibility of the application virtualization layers. For example, the actionable conflict resolution report may indicate that two application virtualization layers comprise different versions of the same file and the files are located in the same location in the file system. In such an example, the layer conflict resolution module 524 may determine that application virtualization layer compatibility is maximized by assigning a higher priority to the file with the higher version. Similarly, the actionable conflict resolution report may indicate that two application virtualization layers comprise different versions of a Component Object Model (COM+) application programming interface (API). In this example, the layer conflict resolution module 524 may determine that application virtualization layer compatibility is maximized by assigning a higher priority to the interface with the higher priority. In yet another scenario, an application virtualization layer may contain a 64-bit version of an application. In such a scenario, the layer conflict resolution module 524 may prevent the application virtualization layer from being delivered to client computing devices 540 which are not capable of executing 64-bit applications.

The layer prioritization module 526 may be configured to arrange the application virtualization layers 510 in a priority or precedence order based on the priority information comprised in the actionable conflict resolution report and based on the priority determinations made by the layer conflict resolution module 524. The application virtualization layers 510 that have been assigned a higher priority may take precedence over the application virtualization layers 510 that have been assigned a lower priority. In some embodiments, the layer prioritization module 526 may generate an application virtualization layer priority report that may be used by other computing devices, e.g. the client computing devices 540, to determine the priority or precedence order for deploying the application virtualization layers 510.

The layer merging module 528 may be configured to merge the ordered application virtualization layers 510 into a single application virtualization layer. The merged single application virtualization layer may deliver all the applications comprised within each of the application virtualization layers 510. Accordingly, only a single application virtualization layer may be delivered and executed by the client computing devices 540. Alternatively, the application virtualization layer optimization service 520 may deliver the ordered application virtualization layers 510 to the client computing devices 540 and the client computing devices 540 may merge the application virtualization layers 510 locally. Merging the ordered application virtualization layers 510 may create a single application virtualization layer which may be solely attached or streamed to the client computing devices 540. The ordered application virtualization layers 510 may be merged with an application virtualization layer comprising an operating system, and the resulting merged layer may replace the operating system image on the client computing devices 540. The layer merging module 528 may be configured to not include an isolation layer between the merged application virtualization layers 510. That is, the one or more applications in the resulting merged application virtualization layer may not be isolated from the other applications in the merged application virtualization layer.

Merging the ordered application virtualization layers 510 may improve performance of the client computing device 540 as most of the processing to merge the ordered application virtualization layers 510 is performed once per delivery rather than on every boot sequence of the client computing device 540. Additionally, merging multiple application virtualization layers into a single layer may permit delivery of an amount of application virtualization layers that may otherwise exceed the maximum supported capacity of the target client computing device for virtual disks. Another advantage of merging the application virtualization layers 510 may be a reduced Input/Output Operations per Second (IOPS) footprint on the client computing device 540. Thus the merged application virtualization layer may provide improved run-time performance when compared to delivering the application virtualization layers 510 separately.

The application virtualization layer optimization service 520 may be configured to deliver the merged application virtualization layers 510 to the compatible client computing devices 540. In other words, the application virtualization layer optimization service 520 may determine which of the client computing devices 540 are compatible with the merged application virtualization layers 510, based on the actionable conflict resolution report. Based on the determination of which client computing devices 540 are compatible, the application virtualization layer optimization service 520 may deliver the merged application virtualization layers 510 only to those client computing devices 540 which are compatible with the merged application virtualization layers 510. Alternatively, the application virtualization layer optimization service 520 may deliver the ordered application virtualization layers 510 which are compatible with the client computing devices 540 and the client computing devices 540 may merge the ordered and compatible application virtualization layers 510 locally.

The application virtualization layers 510 may be delivered to the client computing devices 540 at various stages: prior to startup, during the startup sequence, during user login, and post user login. The application virtualization layer optimization service 520 may deliver the ordered and merged application virtualization layers 510 to a storage device which the client computing devices 540 may access during their startup sequence. For example, the application virtualization layer optimization service 520 may deliver a single merged application virtualization layer 510 which comprises the operating system and all the applications designated for the client computing devices 540. The client computing devices 540 may attach or mount the single merged application virtualization layer 510 and use the layer as their boot-up operating system image or replace the operating system image in the hypervisor if or when the client computing device 540 is a virtual machine. Using this technique, the application virtualization layer optimization service 520 may support applications that require early boot drivers installed on the target environment in order to provide their functionality. The application virtualization layer optimization service 520 may also deliver the application virtualization layers 510 on demand during the startup sequence of the client computing devices 540. The client computing devices 540 may attach or mount the delivered application virtualization layers 510. Alternatively, the application virtualization layers 510 may be streamed to the client computing devices 540 as a one or more virtual disks using provisioning technologies like Citrix Provisioning Services (PVS) and Machine Creation Services (MCS), both manufactured by Citrix Systems, Inc. of Ft. Lauderdale, Fla., and App-V manufactured by Microsoft Corporation of Redmond, Wash.

Additionally, the application virtualization layer optimization service 520 may deliver the application virtualization layers 510 to the client computing devices 540 in response to a user login on a particular client computing device 540. The application virtualization layer optimization service 520 may be further configured to determine which application virtualization layers 510 to deliver based on the identity of the user login into the particular client computing device 540.

In some embodiments, the application virtualization layer optimization service 520 may update one or more applications comprised in one or more of the application virtualization layers 510. For example, a new version of an application may have become available which may require that one of the application virtualization layers 510 be updated to include the new version of the application. In these embodiments, the layer analysis service 522 may re-analyze the updated application virtualization layers 510 with the remaining application virtualization layers 510 and generate an updated actionable conflict resolution report. Subsequently, as described in greater detail above, the application virtualization layer optimization service 520 may resolve the conflicts indicated in the updated actionable conflict resolution report, as well as, order and merge the application virtualization layers 510 based on the updated actionable conflict resolution report. The application virtualization layer optimization service 520 may be configured to deliver the updated application virtualization layers 510 to the client computing devices 540 as described above.

In other embodiments, using the functions and techniques described herein, the application virtualization layer optimization service 520 may obtain one or more application virtualization layers 510 each comprising one of a variety of types and versions of operating systems, as well as, one or more application virtualization layers 510 each comprising a single application. In these other embodiments, the application virtualization layer optimization service 520 may automatically determine which application virtualization layers 510 to merge and deliver to the client computing devices 540 based on the capabilities of the targeted client computing devices 540 and the users login into these client computing devices 540. For example, application virtualization layer optimization service 520 may deliver a different mix of operating system and applications to a client computing device 540 based on the type of device (e.g., desktop, laptop, smartphone) and on the user login into the device (e.g. users from engineering department may receive one set of applications, while users from accounting department may receive a different set of applications.)

Advantageously, and as illustrated in greater detail above, the application virtualization layer optimization service 520 may automatically analyze and resolve conflicts, prioritize, and merge application virtualization layers 510 to be delivered to client computing devices 540. In addition, the application virtualization layer optimization service 520 may determine which application virtualization layers 510 to deliver to the client computing devices 540 based on the capabilities of the client computing devices and the role of the users login into the particular client computing devices 540. Furthermore, the application virtualization layers may be updated as needed and automatically analyzed, prioritized, merged, and delivered with the remaining application virtualization layers.

FIG. 5 illustrates just one example of a system architecture that may be used, and those of skill in the art will appreciate that the specific system architecture and computing devices used may vary, and are secondary to the functionality that they provide, as further described herein. For example, the services provided by the application virtualization layer optimization service 520 may be executed on a single computing device or on multiple computing devices at one site or distributed across multiple sites and interconnected by a communication network.

Figure 6:
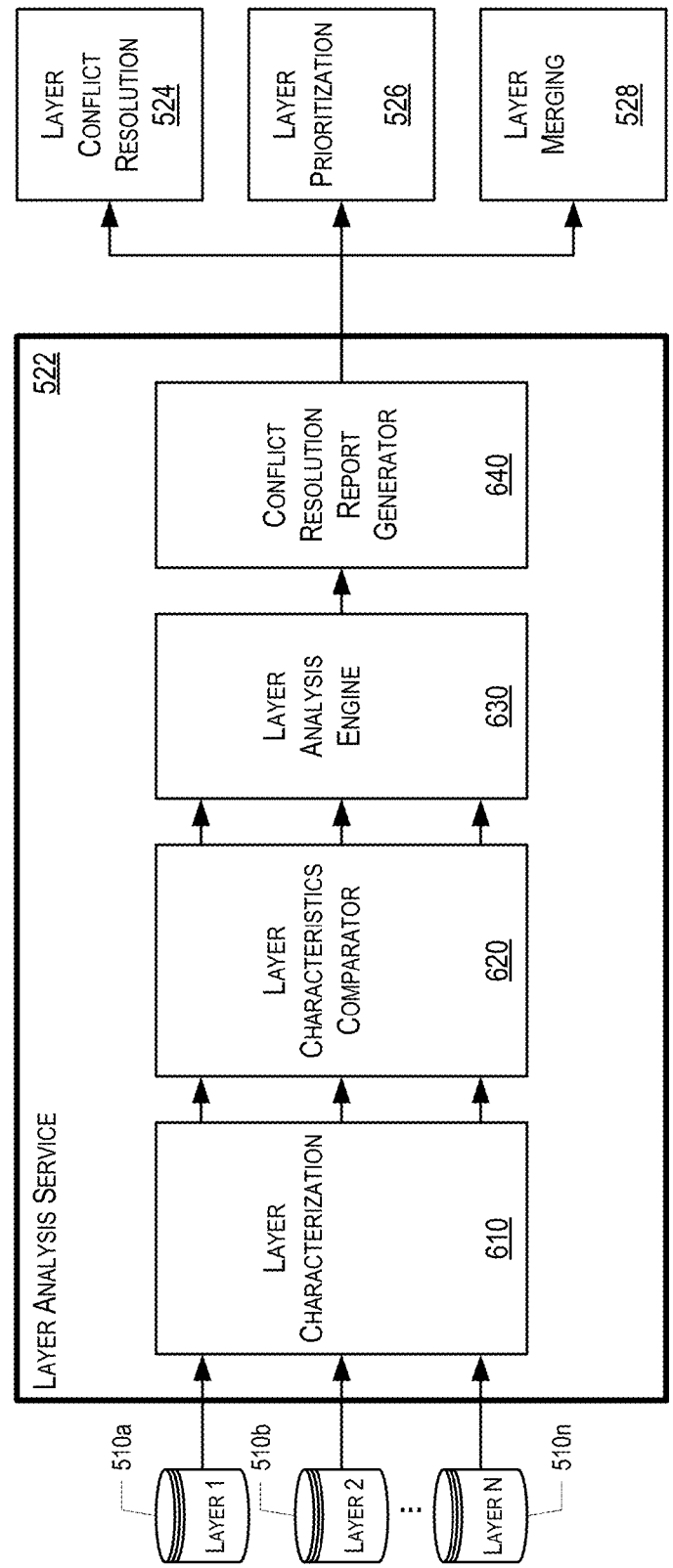
FIG. 6 depicts an illustrative service suitable for analyzing the application virtualization layers, according to one or more illustrative aspects described herein.

FIG. 6 illustrates an exemplary layer analysis service 522 suitable for use as part of the application virtualization layer optimization service 520 described above in reference to FIG. 5. As illustrated, the layer analysis service 522 may analyze the application virtualization layers 510 and provide the results of said analysis to the layer conflict resolution module 524, the layer prioritization module 526, and the layer merging module 528. As further shown in FIG. 6, the layer analysis service 522 may comprise a layer characterization module 610, a layer characteristics comparator 620, a layer analysis engine 630, and a conflict resolution report generator 640.

The layer characterization module 610 may determine or extract one or more operational characteristics for each application virtualization layer 510. The application virtualization layer operational characteristics may include at least one or more of the following: boot-time dependencies, run-time dependencies, login-time dependencies, operating system dependencies, computer architecture dependencies, framework dependencies, shared library dependencies, dynamically-linked library dependencies, application programming interface dependencies, and services dependencies. Additionally, the layer characterization module 610 may be further configured to determine the operational characteristics for each application included in each application virtualization layer 510. In some embodiments, an external computing device may determine the operational characteristics of the application virtualization layers 510, and of the applications within the application virtualization layers 510, and may provide the information to the layer analysis service 522.

The layer characteristics comparator 620 may perform comparisons of the operational characteristics for each application virtualization layer 510 with the operational characteristics of every other application virtualization layer 510. Additionally, the layer characteristics comparator 620 may be further configured to compare the operational characteristics for each application included in each application virtualization layer 510 with the operational characteristics of every other application included in the particular application virtualization layer 510.

The layer analysis engine 630 may be configured to execute one or more algorithms on the collected operational characteristics to determine compatibility conflicts between the application virtualization layers 510. The layer analysis engine 630 may prescribe remediations for the compatibility conflicts between the application virtualization layers 510. The layer analysis engine 630 may perform basic compatibility checks. For example, the layer analysis engine 630 may check the application virtualization layers 510 for dependencies on obsolete components not supported on any modern operating systems (e.g., Graphical Identification and Authentication, GINA.) The layer analysis engine 630 may also perform operating system dependency checks. For example, the layer analysis engine 630 may analyze the application virtualization layers 510 to determine whether they require a 32-bit or a 64-bit operating system. The layer analysis engine 630 may also check for dependencies on obsolete technologies (e.g. NetDDE on Windows Server 2012), for dependencies on side-by-side libraries (e.g., .NET framework), and for missing dependencies. Additionally, the layer analysis engine 630 may perform compatibility checks with operating system components included in the application virtualization layers 510. For example, the layer analysis engine 630 may check for dependencies on specific versions of Windows runtime libraries. Other possible sources of conflicts may include, but are not limited to, file system, system registry database, Windows Management Instrumentation (WMI) database, Component Object Model (COM+) registration database, Security Account Manager (SAM) database, system catalog database, and dynamically-linked library version conflicts. These conflicts may make the environment of the client computing device 540 unstable or make some of the applications in the application virtualization layers 510 unusable. The layer analysis algorithms are not limited to the examples described herein. The layer analysis engine may be configured to accept new algorithms which may be added to improve the quality of the analysis.

The layer analysis engine 630 may further determine a priority or precedence order for the application virtualization layers 510 based on the comparison data from the layer characteristics comparator 620 and the compatibility conflicts. The layer analysis engine 630 may predict a prioritization of application virtualization layers 510 with respect to other application virtualization layers 510 in order to maximize application compatibility. Additionally, by analyzing the operational characteristics of the application virtualization layers 510, the layer analysis engine 630 may determine incompatible application virtualization layers 510. By further examining and analyzing the operational characteristics of the application virtualization layers 510, the layer analysis engine 630 may also determine candidate target computing devices which are compatible with the application virtualization layers 510. For example, the layer analysis engine 630 may determine whether an application virtualization layer created for a Microsoft Windows 7 operating system may also be compatible with a client computing device using a Microsoft Windows 8 operating system. Furthermore, the layer analysis engine 630 may also determine deployment methods which are compatible with the application virtualization layers 510. For example, the layer analysis engine 630 may determine whether an application virtualization layer 510 may be delivered to a client computing device 540 in response to a user login or whether the application virtualization layer 510 requires to be delivered during the startup sequence of the client computing device 540.

The conflict resolution report generator 640 may be configured to generate an actionable conflict resolution report which comprises the determined compatibility conflicts and their corresponding prescribed remediations. That is, the actionable conflict resolution report may contain actionable rules to resolve the detected compatibility conflicts between the application virtualization layers 510 in order to prevent destabilizing the client computing devices 540 or causing the delivered applications to malfunction. The actionable conflict resolution report may also comprise determinations of a priority or precedence order for the application virtualization layers 510, determinations of candidate target computing devices compatible with the application virtualization layers 510, and determinations of compatible deployment methods, as determined by the layer analysis engine 630. The conflict resolution report generator 640 may be configured to provide the actionable conflict resolution report to the layer conflict resolution module 524, the layer prioritization module 526, and the layer merging module 528, for further processing. In some embodiments, the conflict resolution report generator 640 may be further configured to provide the actionable conflict resolution report to other computing devices or systems (e.g., client computing devices 540) in order to support run-time merging of the delivered application virtualization layers 510. In yet other embodiments, the conflict resolution report generator 640 may provide the actionable conflict resolution report to an end user to assist the end user in manually merging application virtualization layers.

FIG. 6 illustrates just one example of a system architecture that may be used, and those of skill in the art will appreciate that the specific system architecture and computing devices used may vary, and are secondary to the functionality that they provide, as further described herein. For example, the services provided by the layer analysis service 522 may be executed on a single computing device or on multiple computing devices at one site or distributed across multiple sites and interconnected by a communication network. Additionally, in one embodiment, the layer analysis service 522 may include one or more computing devices executing application management software, or other software that performs application compatibility and testing functions. An example of such software that may be used is APPDNA, which is commercially available from Citrix Systems, Inc., of Fort Lauderdale, Fla.

Figure 7:
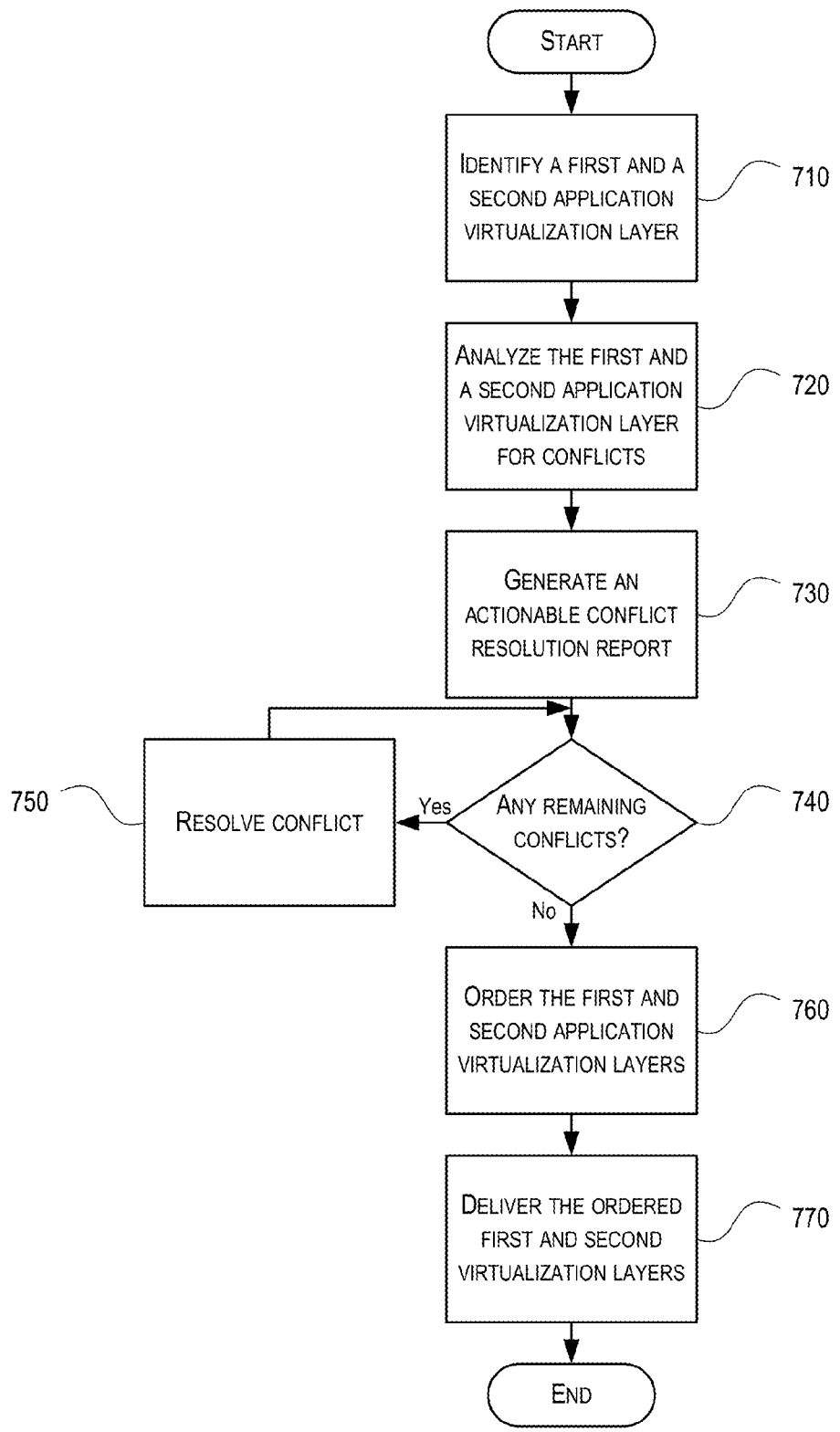
FIG. 7 depicts a flowchart that illustrates a method for optimizing and enhancing delivery of application virtualization layers to client computing devices in accordance with one or more example embodiments.

FIG. 7 depicts a flowchart that illustrates a method for optimizing and enhancing delivery of application virtualization layers to client computing devices in accordance with one or more example embodiments. The algorithm shown in FIG. 7 and other similar examples described herein may be performed in a computing environment such as the systems illustrated in FIGS. 5 and 6, as well as other systems having different architectures (e.g., all or part of FIGS. 1-4). In other embodiments, the method illustrated in FIG. 7 and/or one or more steps thereof may be embodied in a computer-readable medium, such as a non-transitory computer readable memory.

In step 710, the application virtualization layer optimization service 520 may identify one or more application virtualization layers 510 to be delivered to one or more client computing devices. Each application virtualization layer 510 represents a package of one or more applications. For example, the application virtualization layers 510 may include files, system registry entries, and data related to one or more applications to be delivered and executed by the client computing devices 540.

In step 720, the layer analysis service 522 may analyze the application virtualization layers 510 for conflicts between the application virtualization layers 510. As described in greater detail above in reference to FIG. 6, the layer analysis service may compare one or more operational characteristics of the application virtualization layers 510 to determine compatibility conflicts, prescribe resolutions for said compatibility conflicts, determine a priority or precedence order, and determine candidate target computing devices and deployment methods compatible with the application virtualization layers 510. The application virtualization layer operational characteristics may include at least one or more of the following: boot-time dependencies, run-time dependencies, login-time dependencies, operating system dependencies, computer architecture dependencies, framework dependencies, shared library dependencies, dynamically-linked library dependencies, application programming interface dependencies, and services dependencies.

In step 730, the layer analysis service 522 may generate an actionable conflict resolution report comprising the results of the analysis performed in step 720. That is, the actionable conflict resolution report may include the compatibility conflicts and their corresponding prescribed remediations determined in step 720, as well as, determinations of a priority or precedence order for the application virtualization layers 510, determinations of candidate target computing devices compatible with the application virtualization layers 510, and determinations of compatible deployment methods, as determined by the layer analysis engine 630.

In step 740, the application virtualization layer optimization service 520 may determine whether any of the conflicts indicated on the actionable conflict resolution report remain unresolved. Based on the determination, the application virtualization layer optimization service 520 may proceed to step 750 to resolve the actionable conflict indicated on the actionable conflict resolution report. The application virtualization layer optimization service 520 may continue to repeat steps 740 and 750 until all conflicts indicated on the actionable conflict resolution report are resolved. In step 760, application virtualization layer optimization service 520 may order the application virtualization layers 510 in a priority or precedence order based on the priority information comprised in the actionable conflict resolution report and based on the priority determinations made by the layer conflict resolution module 524. In step 770, the application virtualization layer optimization service 520 may deliver the application virtualization layers 510 to the one or more client computing devices 540.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    identifying a first application virtualization layer and a second application virtualization layer to be delivered to one or more client computing devices, wherein each application virtualization layer represents a package of one or more applications;
    analyzing, using a layer analysis service, the first application virtualization layer and the second application virtualization layer for conflicts between the layers, using predetermined conflict analysis rules, wherein the analyzing to calculate the conflicts comprises comparing one or more operational characteristics of the first application virtualization layer with corresponding one or more operational characteristics of the second application virtualization layer;
    determining, based on the comparison, a candidate target computing device compatible with the first and second application virtualization layers;
    generating, using the layer analysis service, an actionable conflict resolution report based on the analysis of the first application virtualization layer and the second application virtualization layer;
    resolving conflicts indicated on the actionable conflict resolution report; ordering the first application virtualization layer and the second application virtualization layer based on the actionable conflict resolution report; and
    delivering the ordered first application virtualization layer and the second application virtualization layer to the one or more client computing devices.

2. The method of claim 1, wherein the first virtualization layer comprises files, system registry entries, and data related to the one or more applications comprised by the first application virtualization layer, and wherein the second virtualization layer comprises files, system registry entries, and data related to the one or more applications comprised by the second application virtualization layer.

3. The method of claim 1, wherein the first application virtualization layer comprises an operating system virtualization layer, and wherein the second application virtualization layer comprises one or more applications specific to one or more predetermined users with a common-set of roles.

4. The method of claim 1, wherein the analyzing the first application virtualization layer and the second application virtualization layer for conflicts between the layers, comprises:
    wherein the operational characteristics comprise at least one or more of the following: boot-time dependencies, run-time dependencies, login-time dependencies, operating system dependencies, computer architecture dependencies, framework dependencies, shared library dependencies, dynamically-linked library dependencies, application programming interface dependencies, or services dependencies.

5. The method of claim 1, wherein analyzing the first application virtualization layer and the second application virtualization layer for conflicts between the layers, further comprises:
    analyzing each of the one or more applications comprised by the first application virtualization layer for conflicts with each of the other one or more applications comprised by the first virtualization application layer, using predetermined conflict analysis rules; and
    analyzing each of the one or more applications comprised by the second application virtualization layer for conflicts with each of the other one or more applications comprised by the second application virtualization layer, using predetermined conflict analysis rules.

6. The method of claim 1, further comprising:
    merging the ordered first application virtualization layer and the second application virtualization layer into a single combined application virtualization layer based on the actionable conflict resolution report; and
    delivering the merged application virtualization layer to the one or more client computing devices.

7. The method of claim 6, wherein the one or more applications originally in the first application virtualization layer are not isolated from the one or more applications originally in the second application virtualization layer in the merged application virtualization layer.

8. The method of claim 6, wherein the delivering the merged application virtualization layer to the one or more client computing devices comprises:
    streaming the merged application virtualization layer to the one or more client computing devices.

9. The method of claim 6, wherein merging the ordered first application virtualization layer and the second application virtualization layer into a single combined application virtualization layer based on the actionable conflict resolution report is performed by the one or more client computing devices.

10. The method of claim 1, wherein delivering the ordered first and second application virtualization layers to the one or more client computing devices, further comprises:
    determining which of the one or more client computing devices are compatible with the ordered first application virtualization layer and the second application virtualization layer based on the actionable conflict resolution report; and delivering the ordered first application virtualization layer and the second application virtualization layer to the compatible one or more client computing devices.

11. The method of claim 1, further comprising:
updating the one or more applications in the second application virtualization layer;
re-analyzing, using the layer analysis service, the updated second application virtualization layer with the first application virtualization layer;
generating, using the layer analysis service, a second actionable conflict resolution report based on the re-analysis of the updated second application virtualization layer;
resolving conflicts indicated on the second actionable conflict resolution report;
ordering the first application virtualization layer and the updated second application virtualization layer based on the second actionable conflict resolution report;
merging the ordered first application virtualization layer and the updated second application virtualization layer into a single combined application virtualization layer based on the second actionable conflict resolution report; and
delivering the single combined application virtualization layer to the one or more client computing devices.

12. The method of claim 1, wherein delivering the ordered first and second application virtualization layers to the one or more client computing devices, further comprises:
delivering the ordered first application virtualization layer and the second application virtualization layer as part of a boot sequence of the one or more client computing devices.

13. The method of claim 1, wherein delivering the ordered first application virtualization layer and the second application virtualization layer to the one or more client computing devices, further comprises:
delivering the ordered first application virtualization layer and the second application virtualization layer to one or more client computing devices in response to a user login.

14. The method of claim 13, further comprising:
determining the identity of the user login into a particular client computing device of the one or more client computing devices;
determining whether to deliver the first application virtualization layer to the client computing device based on the identity of the user; and
determining whether to deliver the second application virtualization layer to the client computing device based on the identity of the user.

15. A system comprising:
at least one processor; and
at least one memory storing computer executable instructions that, when executed by the at least one processor, cause the system to:
identify a first application virtualization layer and a second application virtualization layer to be delivered to one or more client computing devices, wherein each application virtualization layer represents a package of one or more applications;
analyze the first application virtualization layer and the second application virtualization layer for conflicts between the layers, using predetermined conflict analysis rules, wherein the analyze to calculate the conflicts comprises compare one or more operational characteristics of the first application virtualization layer with corresponding one or more operational characteristics of the second application virtualization layer;
determine, based on the comparison, a candidate target computing device compatible with the first and second application virtualization layers;
generate an actionable conflict resolution report based on the analysis of the first application virtualization layer and the second application virtualization layer; resolve conflicts indicated on the actionable conflict resolution report;
order the first application virtualization layer and the second application virtualization layer based on the actionable conflict resolution report; and
deliver the ordered first application virtualization layer and the second application virtualization layer to the one or more client computing devices.

16. The system of claim 15, further comprising additional executable instructions that, when executed by the at least one processor, cause the system to:
merge the ordered first application virtualization layer and the second application virtualization layer into a single combined application virtualization layer based on the actionable conflict resolution report; and
deliver the merged application virtualization layer to the one or more client computing devices.

17. The system of claim 15, wherein delivering the ordered first application virtualization layer and the second application virtualization layer to the one or more client computing devices, further comprises:
determining which of the one or more client computing devices are compatible with the ordered first application virtualization layer and the second application virtualization layer based on the actionable conflict resolution report; and
delivering the ordered first application virtualization layer and the second application virtualization layer to the compatible one or more client computing devices.

18. One or more non-transitory computer-readable medium storing computer-executable instructions that, when executed by a computer system comprising at least one processor, and least one memory, cause the computer system to perform a method comprising:
identifying a first application virtualization layer and a second application virtualization layer to be delivered to one or more client computing devices, wherein each application virtualization layer represents a package of one or more applications;
analyzing the first application virtualization layer and the second application virtualization layer for conflicts between the layers, using predetermined conflict analysis rules, wherein the analyzing to calculate the conflicts comprises comparing one or more operational characteristics of the first application virtualization layer with corresponding one or more operational characteristics of the second application virtualization layer;
determining, based on the comparison, a candidate target computing device compatible with the first and second application virtualization layers;
generating an actionable conflict resolution report based on the analysis of the first application virtualization layer and the second application virtualization layer;
resolving conflicts indicated on the actionable conflict resolution report; ordering the first application virtualization layer and the second application virtualization layer based on the actionable conflict resolution report; and delivering the ordered first application virtualization layer and the second application virtualization layer to the one or more client computing devices.

19. The one or more non-transitory computer-readable medium of claim 18, having additional computer-executable instructions stored thereon that, when executed, further cause the one or more processors to:
merge the ordered first application virtualization layer and the second application virtualization layer into a single combined application virtualization layer based on the actionable conflict resolution report; and
deliver the merged application virtualization layer to the one or more client computing devices.

20. The one or more non-transitory computer-readable medium of claim 18, wherein delivering the ordered first application virtualization layer and the second application virtualization layer to the one or more client computing devices, further comprises:
determining which of the one or more client computing devices are compatible with the ordered first application virtualization layer and the second application virtualization layer based on the actionable conflict resolution report; and
delivering the ordered first application virtualization layer and the second application virtualization layer to the compatible one or more client computing devices.

* * * * *